(12) United States Patent
Ying et al.

(10) Patent No.: US 9,881,649 B2
(45) Date of Patent: Jan. 30, 2018

(54) ASSEMBLED RECORD PLAYER

(71) Applicants: Chi-Shuan Ying, Taipei (TW); Chen Hsu, Taipei (TW); Wei-Kai Huang, Taipei (TW); Li-Chieh Kao, Taipei (TW)

(72) Inventors: Chi-Shuan Ying, Taipei (TW); Chen Hsu, Taipei (TW); Wei-Kai Huang, Taipei (TW); Li-Chieh Kao, Taipei (TW)

( * ) Notice: Subject to any disclaimer, the term of this patent is extended or adjusted under 35 U.S.C. 154(b) by 0 days.

(21) Appl. No.: 15/602,112

(22) Filed: May 23, 2017

(65) Prior Publication Data

US 2017/0365297 A1    Dec. 21, 2017

(30) Foreign Application Priority Data

Jun. 21, 2016  (TW) .............................. 105209281 U

(51) Int. Cl.
| | | |
|---|---|---|
| *G11B 33/06* | (2006.01) | |
| *G11B 33/02* | (2006.01) | |
| *G11B 33/12* | (2006.01) | |

(52) U.S. Cl.
CPC ............ *G11B 33/06* (2013.01); *G11B 33/027* (2013.01); *G11B 33/122* (2013.01)

(58) Field of Classification Search
None
See application file for complete search history.

(56) References Cited

U.S. PATENT DOCUMENTS

| | | | | | |
|---|---|---|---|---|---|
| 3,614,009 | A | * | 10/1971 | Ramult .................. | B65H 20/26 242/326.3 |
| 4,232,202 | A | * | 11/1980 | Mori ........................ | G11B 3/40 369/177 |
| 4,284,279 | A | * | 8/1981 | Mori ........................ | G11B 3/31 369/177 |
| 4,876,678 | A | * | 10/1989 | Koike .................... | G11B 3/001 369/30.02 |
| 6,288,329 | B1 | * | 9/2001 | Kopp ................... | H05K 9/0045 174/378 |
| 2012/0057313 | A1 | * | 3/2012 | Darbinyan ............. | H05K 5/064 361/752 |
| 2013/0086831 | A1 | * | 4/2013 | Mayer ....................... | G09F 1/08 40/124.03 |
| 2017/0025134 | A1 | * | 1/2017 | Pinhas ..................... | G11B 3/46 |

FOREIGN PATENT DOCUMENTS

GB            1095911 A   * 12/1967   ........... A47B 47/042

* cited by examiner

*Primary Examiner* — Will J Klimowicz
(74) *Attorney, Agent, or Firm* — Leong C. Lei

(57) ABSTRACT

An assembled record player includes: a box having a cover and a base, and the cover being covered onto the base, and a accommodating space being included between the cover and the base; a record player contained in the accommodating space; at least one loudspeaker and contained in the accommodating space; and a circuit board contained in the accommodating space. The cover and the base are separated, and an accommodating hole is formed on the cover, and the record player is installed and fixed to the accommodating hole, and the loudspeaker and the circuit board are fixed to the base, and the circuit board is electrically connected to the record player and the loudspeaker, and the cover of the record player is covered onto the base to form the record player. Therefore, users can experience the fun of assembling the record player.

9 Claims, 6 Drawing Sheets

ASSEMBLED RECORD PLAYER

CROSS-REFERENCE TO RELATED APPLICATIONS

This non-provisional application claims priority under 35 U.S.C. §119(a) on Patent Application No(s). 105209281 filed in Taiwan on Jun. 21, 2016, the entire contents of which are hereby incorporated by reference.

FIELD OF THE INVENTION

The present invention relates to the field of playing devices, and more particularly to an assembled portable record player made of an eco-friendly material.

BACKGROUND OF THE INVENTION

1. Description of the Related Art

A gramophone record commonly known as a vinyl record or simply record is one of the earliest media used by humans for storing sound signals. The invention of the Edison disc has a history over a decade, and the vinyl record can record and store a large quantity of sound data for human beings. Up to now, the high development of digital audio technology has not replaced the old-fashion. However, the vinyl record still has a high standard of sound quality and hearing. The vinyl record truly records the history of music, includes a profound cultural content, and always maintains an irresistible charm. Until now, many people have a record player at home.

However, a general record player has many components, so that the record players are sold in an assembled form to prevent the inconvenience assembling or missing any components after during the assembling process. However, the assembled record player is inconvenient to transport due to its large volume, and unable to meet consumer's desire for the fun of DIY. In addition, the resonance box of the record player is generally made of a non-recyclable material, so that when the record player is discarded, the resonance box cannot be recycled or reused, and the conventional record player is unfavorable to environmental protection.

In view of the aforementioned drawbacks, the present invention based on years of experience to conduct extensive research and development, and finally provided an assembled record player in accordance with the present invention to overcome the drawbacks of the prior art.

2. Summary of the Invention

Therefore, it is a primary objective of the present invention to provide an assembled record player to allow users to experience the fun of assembling the record player, and its storage method makes the present invention before being assembled easy to carry, and the components of the record player will not be missing easily during the assembling process.

To achieve the aforementioned and other objectives, the present invention to provide an assembled record player, comprising: a box, having a cover and a base, and the cover covered onto the base, and an accommodating space being defined between the cover and the base; a record player, installed in the accommodating space; at least one loudspeaker, contained in the accommodating space; and a circuit board, contained in the accommodating space; wherein the cover and the base are separated, and the cover has an accommodating hole formed thereon, and the record player is installed and fixed into the accommodating hole, and the loudspeaker and the circuit board are fixed to the base, and after the circuit board is electrically coupled to the record player and the loudspeaker, the base with the record player is covered onto the base to assemble and form the record player. Therefore, users can experience the fun of assembling the record player, and the accommodating space of the cover is provided for storing the required components, so as to prevent missing any component accidentally and providing an easy way to carry the components before the record player is assembled.

In addition, the box is made of a paper material, so as to reduce the non-recycle garbage and provide an environmental protection effect.

Preferably, the cover has a first cutting line reserved thereon, and having a shape corresponsive to the shape of the accommodating hole to facilitate a user to cut the accommodating hole in the cover.

Preferably, the record player is contained in the accommodating space by using a fastener to prevent the record player from being hit by the surrounding inside the accommodating space since the record player has not been fixed yet.

Preferably, the base further has an extension and a second cutting line, and before the cover is covered onto the base, the extension is removed along the second cutting line. To increase the space for storing components inside the box, the extension may be removed during the assembling process, so as to avoid unnecessary waste of space after the record player is assembled.

Preferably, the base further has a third cutting line formed on a surface of the base to cut and form a hole, the circuit board has a power receiving jack, and after the circuit board is fixed to the base, the power receiving jack is configured to be corresponsive to the hole to receive external power supply for the record player.

Preferably, the circuit board has an audio input jack, and after the circuit board is fixed to the base, the audio input jack is configured to be corresponsive to the hole for playing an external audio by the loudspeaker.

Preferably, the circuit board has an audio output jack, and after the circuit board is fixed to the base, the audio output jack is configured to be corresponsive to the hole for outputting music played by the record player to other players through the audio output jack.

Therefore, user may assembly the record player to enjoy the fun of "Do It Yourself (DIY). In addition, all components are contained in the box to improve the convenience of transportation and prevent the components from missing. The box has both packaging and resonance effect. Before the assembling, the box is in form of a package box, and after the assembling, the box becomes a resonance cavity, so that the package box may be reused. Further, the box made of paper has the eco-friendly and recycle effect.

DESCRIPTION OF THE PREFERRED EMBODIMENTS

The above and other objects, features and advantages of this disclosure will become apparent from the following detailed description taken with the accompanying drawings.

Figure 1:
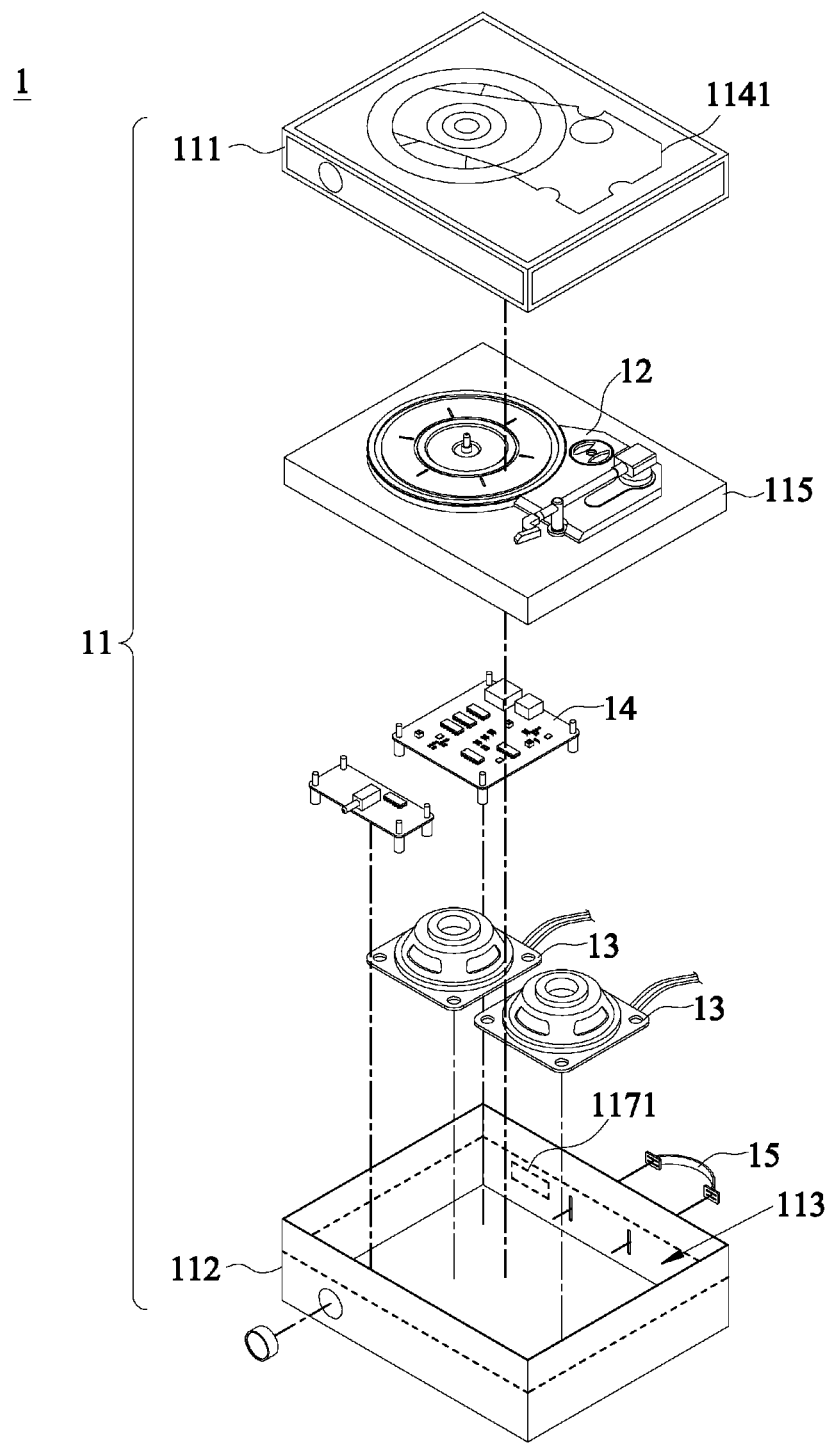
FIG. 1 is an exploded view of a preferred embodiment of the present invention.

With reference to FIG. 1 for an exploded view of an assembled record player 1 in accordance with a preferred embodiment of the present invention, the self-assembled record player 1 comprises a box 11, a record player 12, at least one loudspeaker 13 and a circuit board 14. In this preferred embodiment, there are plural loudspeakers 13. The box 11 is made of a paper material and has a cover 111 and a base 112, and the cover 111 is covered onto the base 112, and a accommodating space 113 is defined between the cover 111 and the base 112, and the record player 12, the loudspeakers 13 and the circuit board 14 are contained in the accommodating space 113. With the storage provided by the accommodating space 113, an unassembled record player may be transported conveniently without worrying about the exposed components being hit or damaged. In this preferred embodiment, the box 11 has a handle 15 provided for users to access and move the box 11 easily.

Figure 2:
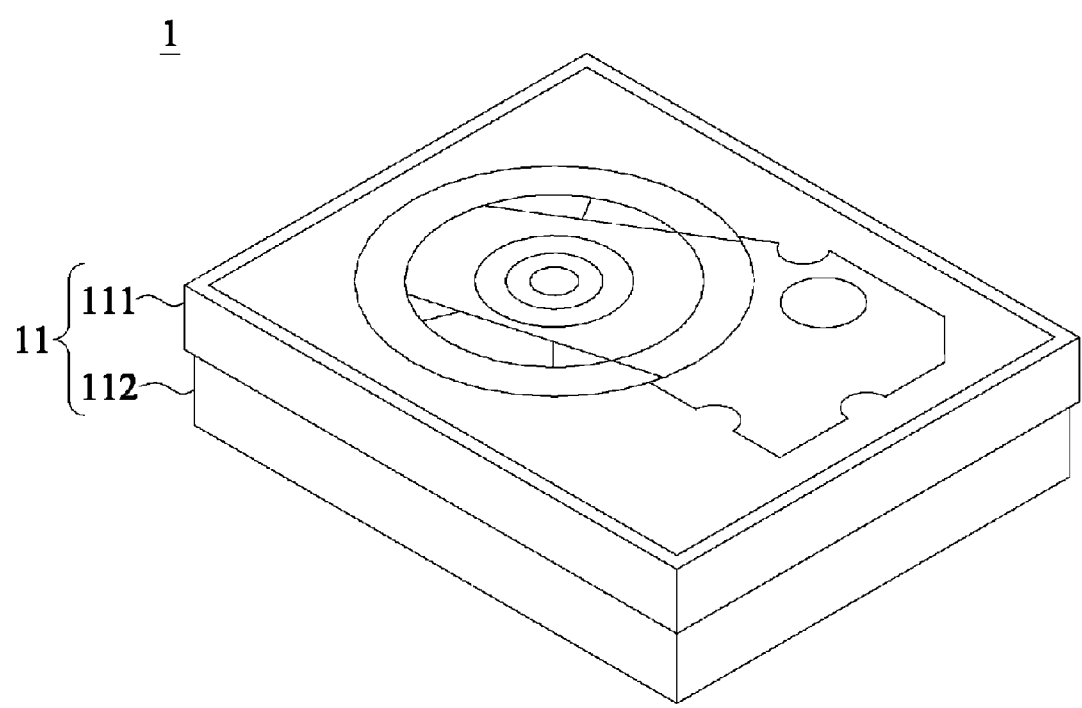
FIG. 2 is a schematic view of a preferred embodiment of the present invention being assembling.
Figure 3:
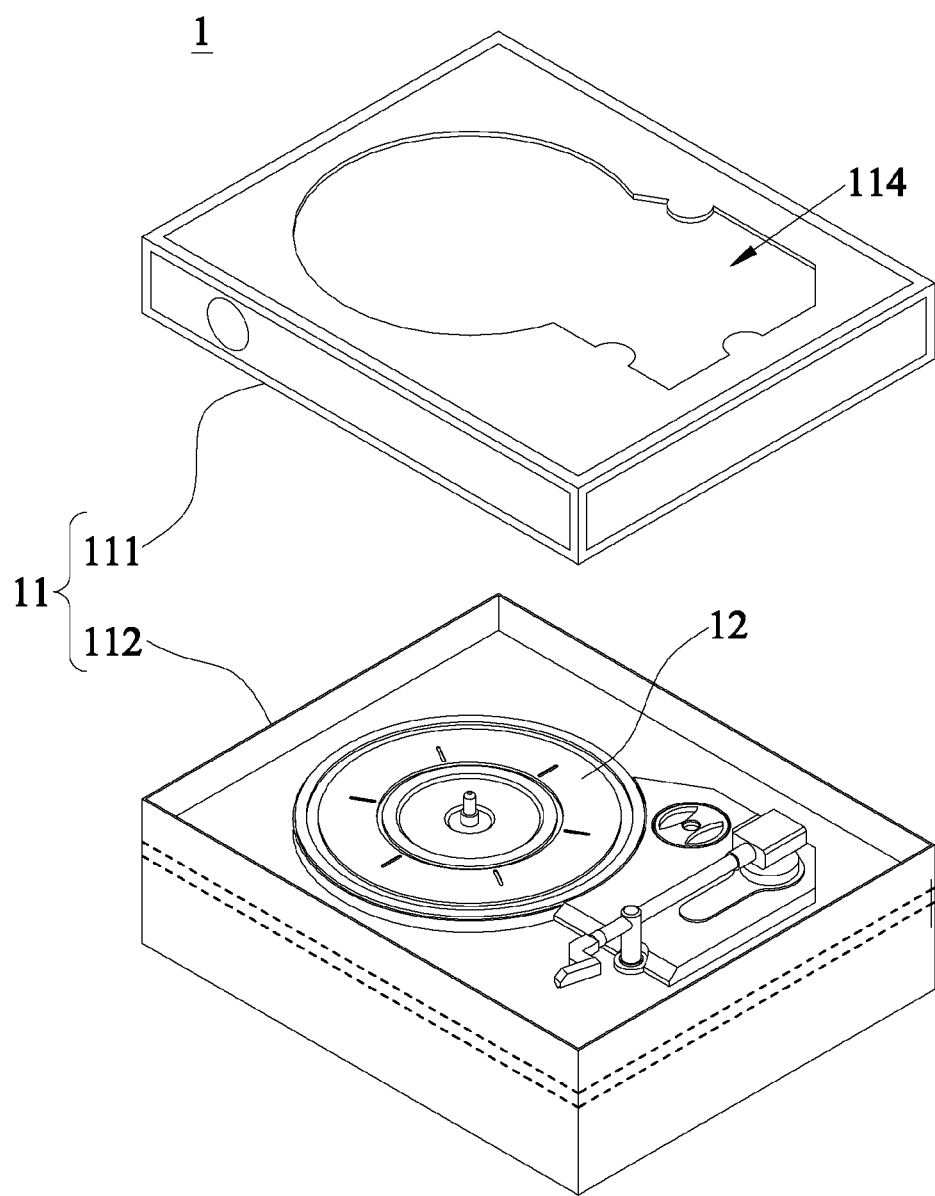
FIG. 3 is a first schematic view of a preferred embodiment of the present invention during the assembling process.

With reference to FIGS. 2 to 6 for schematic views of a preferred embodiment before being assembled, during different assembling steps, and after being assembled respectively, if a user wants to use the record player 1, the user will need to assemble the components of the record player 1 contained in a box package as shown in FIG. 2 into a player as shown in FIG. 2. After the assembling, the user can put a vinyl record on the record player 12 for playing the record. In the assembling process, the cover 111 and the base 112 are separated, and an accommodating hole 114 is formed on the cover 111 as shown in FIG. 3, wherein the accommodating hole 114 is configured to be corresponsive to the record player 12. In this preferred embodiment, the user may cut the accommodating hole 114 from the cover 111 according to a first cutting line 1141 in the shape of the accommodating hole 114.

Figure 4:
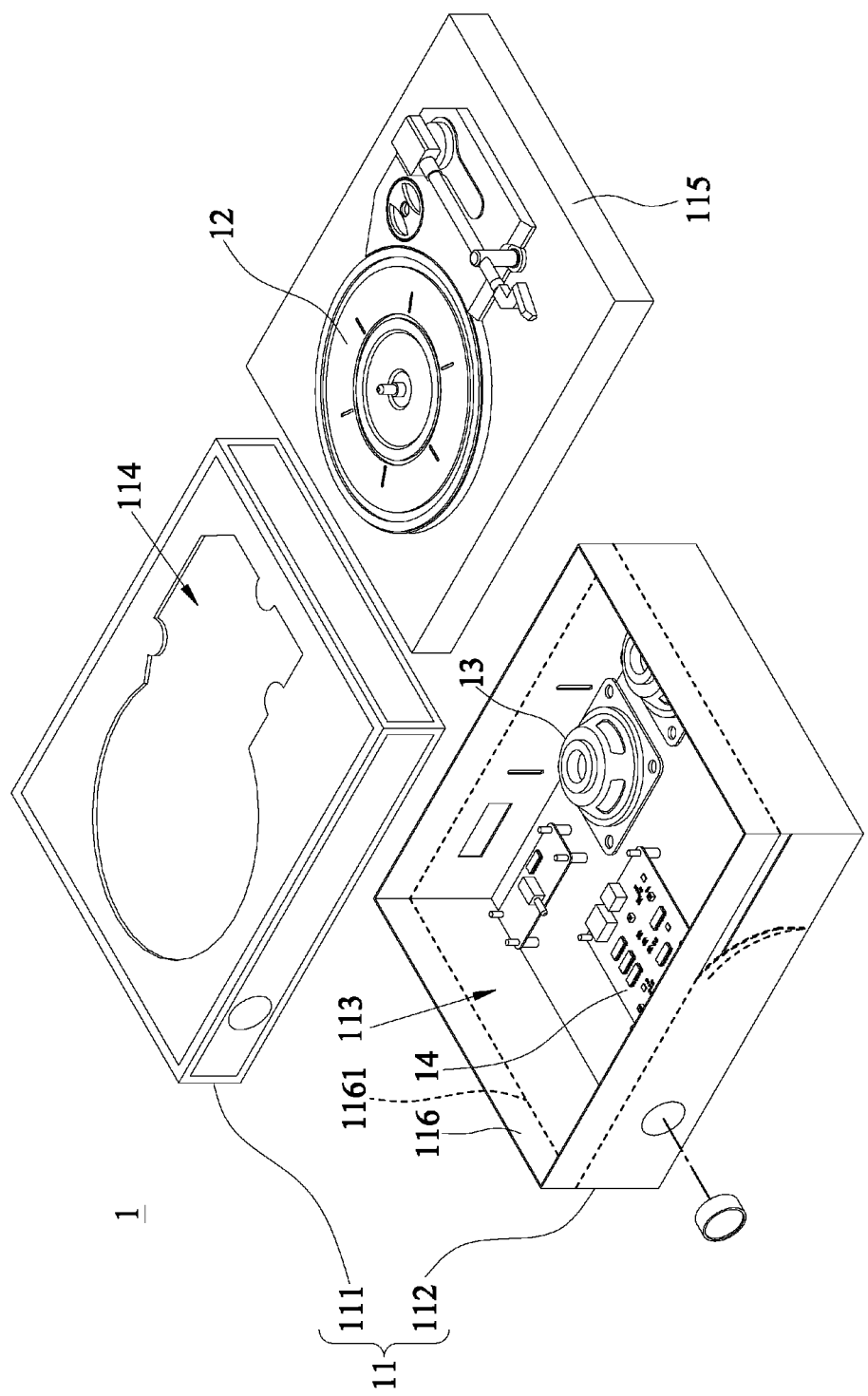
FIG. 4 is a second schematic view of a preferred embodiment of the present invention during the assembling process.

After the accommodating hole 114 is cut and formed, the record player 12 of this preferred embodiment is contained in the accommodating space 113 by using a fastener 115. To increase the space for containing internal components in the box 1 and prevent the record player 12 from being hit by the loudspeakers 13 or the circuit board 14 during transportation, the base comes with a second cutting line 1161 and an extension 116. During the assembling process, the fastener 115 together with the record player 12 are removed from the accommodating space 113, and users may cut and remove an extension 116 along a second cutting line 1161 of the base 112 as shown in FIG. 4 to reduce the total volume of the assembled record player 1.

Figure 5:
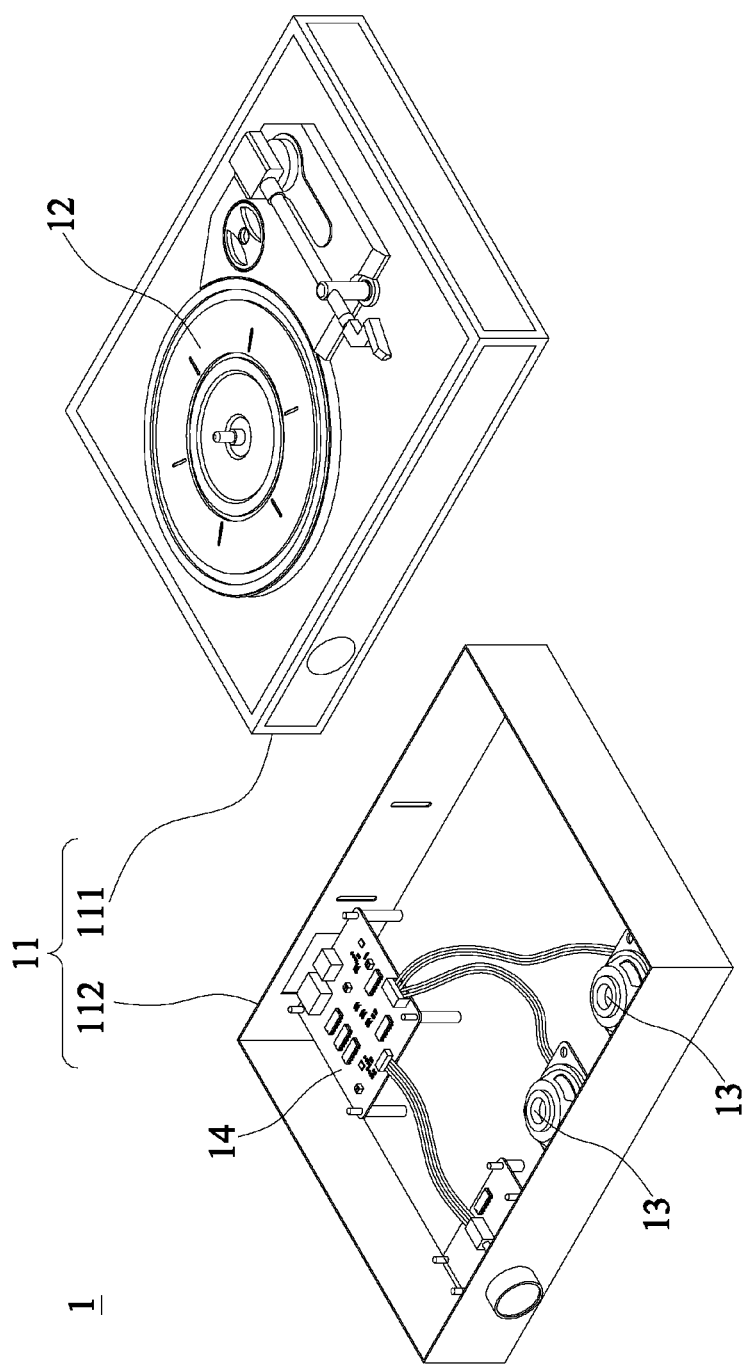
FIG. 5 is a third schematic view of a preferred embodiment of the present invention during the assembling process.
Figure 6:
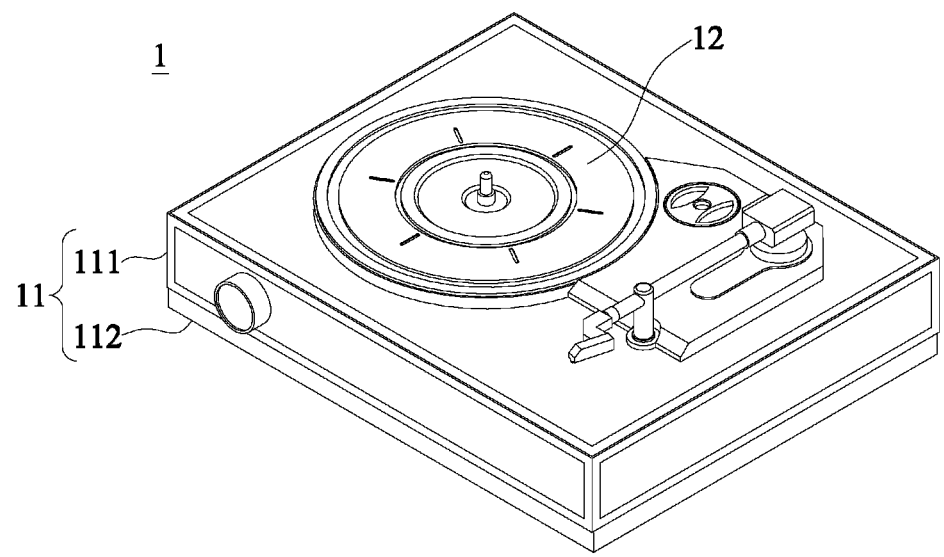
FIG. 6 is a first schematic view of a preferred embodiment of the present invention after being assembled.

After the extension 116 is removed, the user takes the record player 12 away from the fastener 115 and re-installs and fixes the record player 12 to the accommodating hole 114, the loudspeaker 13 and the circuit board 14 are locked to the base 112 by screws as shown in FIG. 5. Finally, the circuit board 14 is electrically coupled to the record player 12 and the loudspeaker 13, and then the cover 111 having the record player 12 is covered onto the base 112 to assemble and form the record player 1 as shown in FIG. 6. Wherein, the extension 116 is removed to reduce the volume of the assembled record player 12, but users may select not to remove the extension 116, so as to increase the resonance space for the loudspeakers 13 and improve the sound playing effect.

In the present invention, the components are contained in the box 11, so that the box 11 has the packaging and containing effects. Since it is not necessary to take most components out from the accommodating space 113, therefore users need not to worry about forgetting or missing the components after they are taken out from the box 11. After the assembling process is completed, the box 11 is changed back into a resonance box of the loudspeaker 13 to provide a better sound effect for the sound outputted from the loudspeaker 13 through resonance. Therefore the box 11 has different functions in different situations. In the meantime, the surface of the box 11 is cut, and the components are assembled, the users may enjoy the fun of DIY. In addition, the present invention allows users to keep the box 11 (which serves as a package box) and provides a new function to the box, and the box 11 is made of paper which is more eco-friendly, and patterns may be formed on the surface of the box 11 as well.

Figure 7:
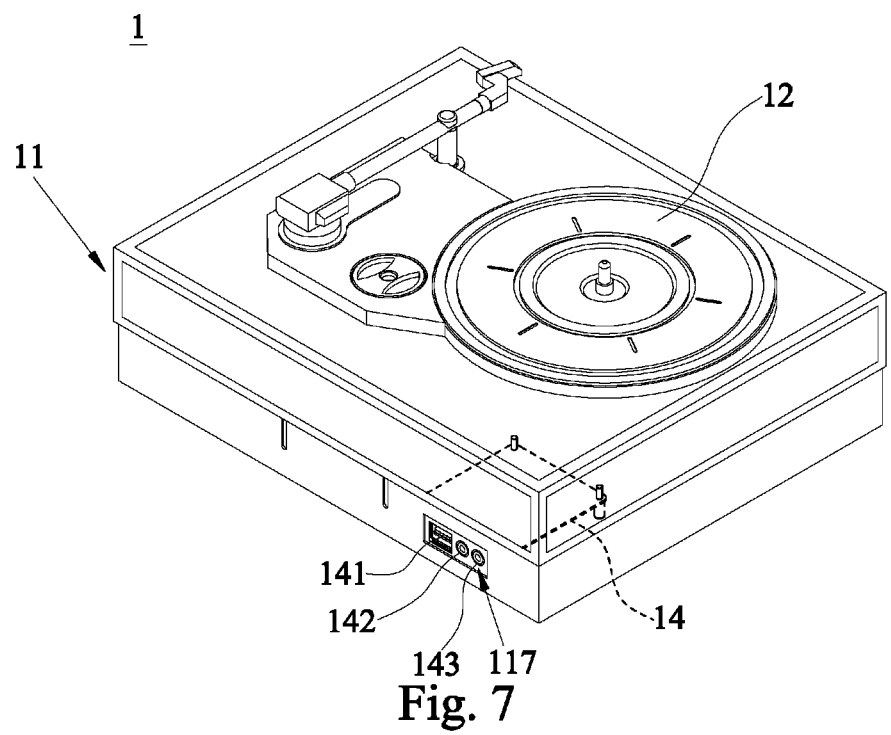
FIG. 7 is a second schematic view of a preferred embodiment of the present invention after being assembled.

With reference to FIG. 7 for the second schematic view of a preferred embodiment of the present invention after being assembled and FIG. 1, the circuit board 14 of this preferred embodiment has a power receiving jack 141, an audio input jack 142 and an audio output jack 143, and a surface of the base 112 further has a third cutting line 1171 for cutting and forming a hole 117, and the users may form the hole 117 along the third cutting line 1171 while installing the circuit board 14. When the circuit board 14 is installed, the power receiving jack 141, the audio input jack 142 and the audio output jack 143 are configured to be corresponsive to the hole 117. Each jack has a different function, and the power receiving jack 141 is provided for obtaining a power supply for the record player 1, wherein the power receiving jack 141 is a USB jack, and the audio input jack 142 is provided for playing an external audio from the loudspeaker 13, and the audio output jack 143 is provided for outputting music played by the record player 12 to other players through the audio output jack 143. Therefore, the present invention has other functions in addition to the function of playing music of a vinyl record.

What is claimed is:

1. An assembled record player, comprising:
    a box, having a cover and a base, and the cover covered onto the base, and an accommodating space being defined between the cover and the base;
    a record player, installed in the accommodating space;
    at least one loudspeaker, contained in the accommodating space; and
    a circuit board, contained in the accommodating space;
    wherein the cover and the base are separated, and the cover has an accommodating hole formed thereon, and the record player is installed and fixed into the accommodating hole, and the loudspeaker and the circuit board are fixed to the base, and after the circuit board is electrically coupled to the record player and the loudspeaker, the cover with the record player is covered onto the base to assemble and form the record player.

2. The assembled record player of claim 1, wherein the box is made of a paper material.

3. The assembled record player of claim 2, wherein the cover has a first cutting line reserved on the cover and having a shape corresponsive to the shape of the accommodating hole to facilitate a user to cut the accommodating hole in the cover.

4. The assembled record player of claim 3, wherein the record player is installed in the accommodating space by using a fastener.

5. The assembled record player of claim 4, wherein the base further has an extension and a second cutting line, and before the cover is covered onto the base, wherein the extension can be removed along the second cutting line.

6. The assembled record player of claim 5, wherein the base further has a third cutting line formed on a surface of the base to cut and form a hole.

7. The assembled record player of claim 6, wherein the circuit board has a power receiving jack, and after the circuit board is fixed to the base, the power receiving jack is configured to be corresponsive to the hole.

8. The assembled record player of claim 7, wherein the circuit board has an audio input jack, and after the circuit board is fixed to the base, the audio input jack is configured to be corresponsive to the hole for playing an external audio by the loudspeaker.

9. The assembled record player of claim 8, wherein the circuit board has an audio output jack, and after the circuit board is fixed to the base, the audio output jack is configured to be corresponsive to the hole for outputting music played by the record player to other players through the audio output jack.

* * * * *